United States Patent [19]

Feldman et al.

[11] Patent Number: 5,733,360
[45] Date of Patent: Mar. 31, 1998

[54] CORONA DISCHARGE REACTOR AND METHOD OF CHEMICALLY ACTIVATING CONSTITUENTS THEREBY

[75] Inventors: Paul L. Feldman, Sykesville, Md.; Krishnaswamy S. Kumar, Millford, N.J.

[73] Assignee: Environmental Elements Corp., Baltimore, Md.

[21] Appl. No.: 628,484

[22] Filed: Apr. 5, 1996

[51] Int. Cl.$^6$ ............................................. B03C 3/41
[52] U.S. Cl. .............. 95/78; 96/80; 96/97; 204/157.3; 204/179; 422/186.04; 422/186.21
[58] Field of Search .................... 96/80, 96, 97; 95/78, 57; 422/4, 5, 22, 121, 186.04, 186.21, 186.23; 204/157.3, 176–179

[56] References Cited

U.S. PATENT DOCUMENTS

| | | | |
|---|---|---|---|
| 913,941 | 3/1909 | Blake | 96/96 |
| 1,381,660 | 6/1921 | Rathbun | 95/57 |
| 2,195,431 | 4/1940 | Shively et al. | 96/97 X |
| 3,633,337 | 1/1972 | Walker et al. | 55/220 X |
| 3,951,624 | 4/1976 | Snader | 96/60 |
| 4,016,060 | 4/1977 | Lowther | 204/176 |
| 4,124,359 | 11/1978 | Geller | 96/65 |
| 4,133,649 | 1/1979 | Milde | 95/80 |
| 4,155,792 | 5/1979 | Gelhaar et al. | 55/DIG. 38 |
| 4,178,156 | 12/1979 | Tashiro et al. | 95/59 |
| 4,189,308 | 2/1980 | Feldman | 95/75 |
| 4,209,306 | 6/1980 | Feldman et al. | 95/80 |
| 4,216,000 | 8/1980 | Kofoid | 361/230 X |
| 4,233,037 | 11/1980 | Pontius et al. | 95/79 |
| 4,260,884 | 4/1981 | Lovelock | 422/98 X |
| 4,289,504 | 9/1981 | Scholes | 95/73 |
| 4,406,762 | 9/1983 | Ray et al. | 204/157.44 |
| 4,666,474 | 5/1987 | Cook | 96/90 |
| 4,734,105 | 3/1988 | Eliasson et al. | 96/97 X |
| 4,746,331 | 5/1988 | Truce | 95/2 |
| 4,936,876 | 6/1990 | Reyes | 95/6 |
| 4,976,752 | 12/1990 | Torok et al. | 96/97 X |
| 5,009,683 | 4/1991 | Sun | 96/80 X |
| 5,030,254 | 7/1991 | Heyen et al. | 96/96 |
| 5,240,575 | 8/1993 | Mathua et al. | 204/177 |
| 5,322,550 | 6/1994 | Park | 96/97 X |
| 5,456,741 | 10/1995 | Takahara et al. | 96/96 X |
| 5,468,454 | 11/1995 | Kim | 422/186.04 X |

FOREIGN PATENT DOCUMENTS

| | | | |
|---|---|---|---|
| 1078096 | 3/1960 | Germany | 96/97 |
| 6-238194 | 8/1994 | Japan | 96/97 |
| 179897 | 2/1966 | U.S.S.R. | 96/97 |
| 714589 | 9/1954 | United Kingdom | 96/97 |

*Primary Examiner*—Richard L. Chiesa
*Attorney, Agent, or Firm*—Morton J. Rosenberg; David I. Klein; Jun Y. Lee

[57] ABSTRACT

A corona discharge reactor (10) and method for chemically activating various constituents of a gas stream by use of corona discharge is provided. The corona discharge reactor (10) includes within a conduit a discharge plate (30a,b) having a plurality of through openings (33) and a plurality of projecting corona discharge electrodes (31,31',35,35'), and an electrode plate (40a,b,c) having a plurality of through openings (43) displaced from and opposing the tips (32) of the corona discharge electrodes (31,31',35,35'). A pulsed energization scheme is employed to intermittently generate a uniformly distributed corona discharge cloud (1000) between the plurality of corona discharge electrode tips (32) and the electrode plate (40a,b,c) during passage of the gas stream through the conduit. In an alternate embodiment, a back corona discharge member (60a,b,c,d) formed of a high resistance material is overlaid across that face of the electrode plate (40a,b,c) opposing the tips (32) of the corona discharge electrodes (31,31',35,35'). As corona discharge is generated from the tips (32) of the corona discharge electrodes (31,31',35,35'), the intense electric field generated in the high resistance material of the back corona discharge member (60a,b,c) generates back corona discharge. As flue gas passes through the interstices of this high resistance material, further chemical activation of the gas stream constituents is effected by the resulting back corona discharge.

5 Claims, 5 Drawing Sheets

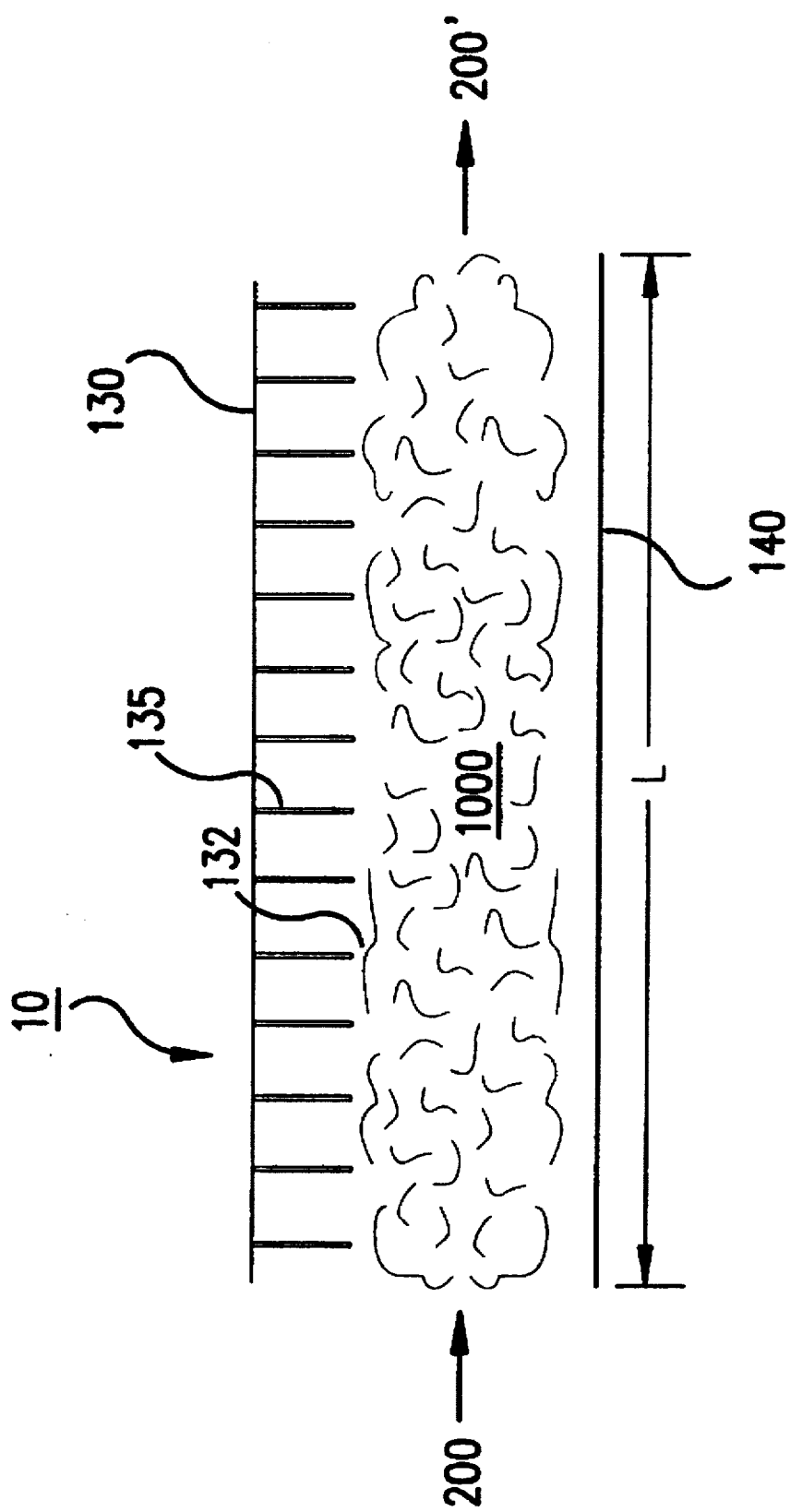

CORONA DISCHARGE REACTOR AND METHOD OF CHEMICALLY ACTIVATING CONSTITUENTS THEREBY

BACKGROUND OF THE INVENTION

1. Field of the Invention

The subject corona discharge reactor is generally directed to a system for treating constituents of a gas stream. More specifically, the subject corona discharge reactor is an improved system for converting such constituents of flue gas as $SO_2$, $NO_x$, and mercury vapor to forms which are removable from a flue gas system. For this purpose, the subject corona discharge reactor generates in the path of the flowing flue gas a spatially distributed corona discharge cloud. In an alternate embodiment, the subject corona discharge reactor also generates back corona discharge having an electrical polarity opposite that of the generated corona discharge cloud. The generated corona yields ions and radicals that react with and thereby oxidize or reduce the various particulates contained in the passing flue gas.

Corona is a term used to describe the gaseous breakdown which occurs when a gas is sufficiently stressed electrically. Typically, corona is generated by passing a gas stream through an electric field generated between two electrodes having a potential difference applied thereacross. This results, for instance in the case of negative corona, in the emission from the emitter electrode of energetic electrons which collide with the passing gas molecules to produce a plasma region wherein various ions and radicals are formed. This is visible as a stable glow discharge—referred to as corona discharge—wherein ions and radicals are available for reaction with molecules of various constituents of the passing gas stream. The generation of corona, and its effectiveness in converting constituents of a passing gas stream depend on the gas stream composition, on the system temperature, pressure, and on the electrode geometry employed.

Back corona is a term used to describe the gaseous breakdown that occurs when a highly resistive layer of dust collects on the collection electrode in an electrostatic precipitator employing corona discharge. As poorly conducting dust builds up on the collecting electrode, the forward corona current flowing through it creates an intense electric field having a magnitude proportional to the resistivity of the dust. As the intensity of this electric field approaches the breakdown strength of the gas stream interstitially passing through the layer of collected dust, breakdown of the passing gas occurs, resulting in a glow discharge having a polarity opposite that of the forward corona discharge.

Typically, the generation of back corona is considered highly undesirable, and measures are taken to mitigate or eliminate its effects. In one embodiment of the subject corona discharge reactor, however, back corona is actively generated for constructive use in aiding the conversion of various constituents of a gas stream.

2. Prior Art

Reactor systems for converting the form of pollutant molecules contained in a gas stream by use of corona discharge are known in the prior art. In addition, reactor systems wherein back corona is unintentionally and undesirably generated are known. The closest prior art known includes U.S. Pat. Nos. 4,155,792; 5,030,254; and, 4,746,331. Additional prior art known to Applicant include U.S. Pat. Nos. 4,016,060; 4,209,306; 1,381,660; 3,633,337; 4,936,876; 4,233,037; 4,216,000; 4,260,884; 4,133,649; 4,666,474; 4,124,359; 3,951,624; 4,178,156; 5,240,575; and, 4,289,504.

None of the systems disclosed in this prior art provides for the structure provided in the subject corona discharge reactor for generating a spatially-distributed corona discharge cloud, nor for optimally exposing thereto the constituents of a passing gas stream. For instance, U.S. Pat. No. 4,155,792 is directed to a process for producing a honeycomb structure in an electrostatic precipitator. Although the honeycomb structure divides a gas stream into a plurality of parallel flow passages, the walls of the honeycomb structure extend along the flow path to serve as the collector electrode for corona discharge wires extending axially through the center of each flow passage thereby formed. The flow passages are thus partitioned, and a separate corona discharge is generated within each passage. There is no collective formation of a spatially distributed corona discharge cloud to which the corona discharge generated within each passage contributes. Moreover, the gas passing through each of the flow passages is not exposed to the concentration of electron energy realized at a plurality of pointed corona discharge electrode tips, as it is in the subject corona discharge reactor. This is a significant difference, for the drop in electron energy occurs quite drastically as spatial separation from a corona discharge point is increased, such that energy levels are significantly lower even at points a short distance away from a corona discharge point. In the preferred embodiment of the subject corona discharge reactor, the gas flowing through each flow passage is proximally and concurrently exposed to a plurality of such corona discharge points.

U.S. Pat. No. 5,030,254 is directed to an electric precipitator having a plurality of orthogonally-shaped parallel flow passages. As in the '792 patent, each flow passage has an electrode wire extending axially through that passage. The shortcomings noted for the '792 system apply equally for this system.

Although the concept of back corona is known in the prior art, the concept of intentionally generating and constructively exploiting back corona in a reactor for converting constituents of a gas stream is not taught in any prior art known to Applicant. U.S. Pat. No. 4,746,331 is directed to detecting and measuring back corona parameters for improving the operation of an electrostatic precipitator in spite of the back corona unintentionally generated thereby. As such, the patent is directed to a means for preventing avoidably adverse operation of an electrostatic precipitator in the presence of back corona, not to intentionally generating and constructively employing it. No back corona discharge member specifically for generating back corona discharge is, therefore, present as it is in the flow path of the preferred embodiment of the subject corona discharge reactor.

SUMMARY OF THE INVENTION

The primary concern in any reactor for chemically activating constituents of a gas stream is the energy efficiency of that system. The key factors affecting this energy efficiency in a corona discharge reactor include the powering scheme employed, as well as the uniformity in spatial distribution of the generated corona discharge and the proximity of the gas stream constituents to the point from which corona-generating electrons are discharged. The subject corona discharge reactor combines features which optimize these factors. In the preferred embodiment of the present invention, the subject corona discharge reactor employs the pulsed corona generation approach, applying high voltage pulses having rise times on the order of 100 nanoseconds or less to a plurality of wire-like corona discharge electrodes distributed across the flow path of a passing gas stream.

Generally, the corona discharge electrodes are supported on and electrically coupled to a discharge plate, each corona discharge electrode defining a corona point for the generation of corona discharge therefrom. An electrode plate is placed in the gas stream flow path opposing the corona points, such that a spatially distributed corona discharge cloud is collectively formed substantially between the plurality of corona points and the electrode plate by the corona discharges from the respective corona points. Means are in place to pass a gas stream through this corona discharge cloud to thereby effect the chemical activation of various gas stream constituents.

In the preferred embodiment, the discharge and electrode plates have formed therethrough a plurality of through holes, and the corona discharge electrodes are dispersed on at least one face of the discharge plate to be adjacent one or more through holes, each corona discharge electrode extending substantially normally from the given discharge plate face. Means are in place to pass a gas stream through the discharge and electrode plate through holes. This divides the flow path of the passing gas stream into a plurality of parallel flow passages of significantly less volume, while successively placing in the path of each flow passage that portion of the corona discharge cloud collectively formed by a predetermined number of discharge electrodes immediately surrounding the discharge plate through holes the flow passage passes through. This has the tri-fold effect of exposing the gas stream to a high concentration of uniformly distributed corona discharge ions and radicals, promoting optimum contact between the constituents of the gas stream with those corona discharge ions and radicals; and, insuring that the resulting chemical activation of those constituents by the corona discharge ions and radicals occurs, in virtually all cases, in close proximity to a corona discharge point where electron energy levels are sufficiently high to fuel the activation.

In an alternate embodiment of the subject corona discharge reactor, at least one back corona discharge member is included in the reactor construction for the generation of and constructive use of back corona in chemically activating gas stream constituents. Among the significant characteristics of back corona are the apparent uniformity and intensity of its glow discharge. The possibilities for constructive exploitation of back corona suggested by these characteristics having, heretofore, gone unnoticed, or at least ignored; an alternate embodiment of the subject discharge reactor intentionally facilitates back corona discharge generation in the flow path of the passing gas stream so as to promote further chemical activation of the gas stream constituents. Highly effective activation is promoted by the uniformly-distributed, energy-rich plasma of the generated back corona.

In the alternate embodiment, that face of the electrode plate opposing the corona points is covered with a porous, highly-resistive material, such as woven fiberglass cloth. As forward corona is generated from the corona discharge electrodes, negative corona current is generated in the highly-resistive material so as to stimulate breakdown of the gas passing through the interstices of that material. Gas stream constituents experience excellent contact with the active radicals of the generated back corona.

DESCRIPTION OF THE PREFERRED EMBODIMENTS

Figure 1:
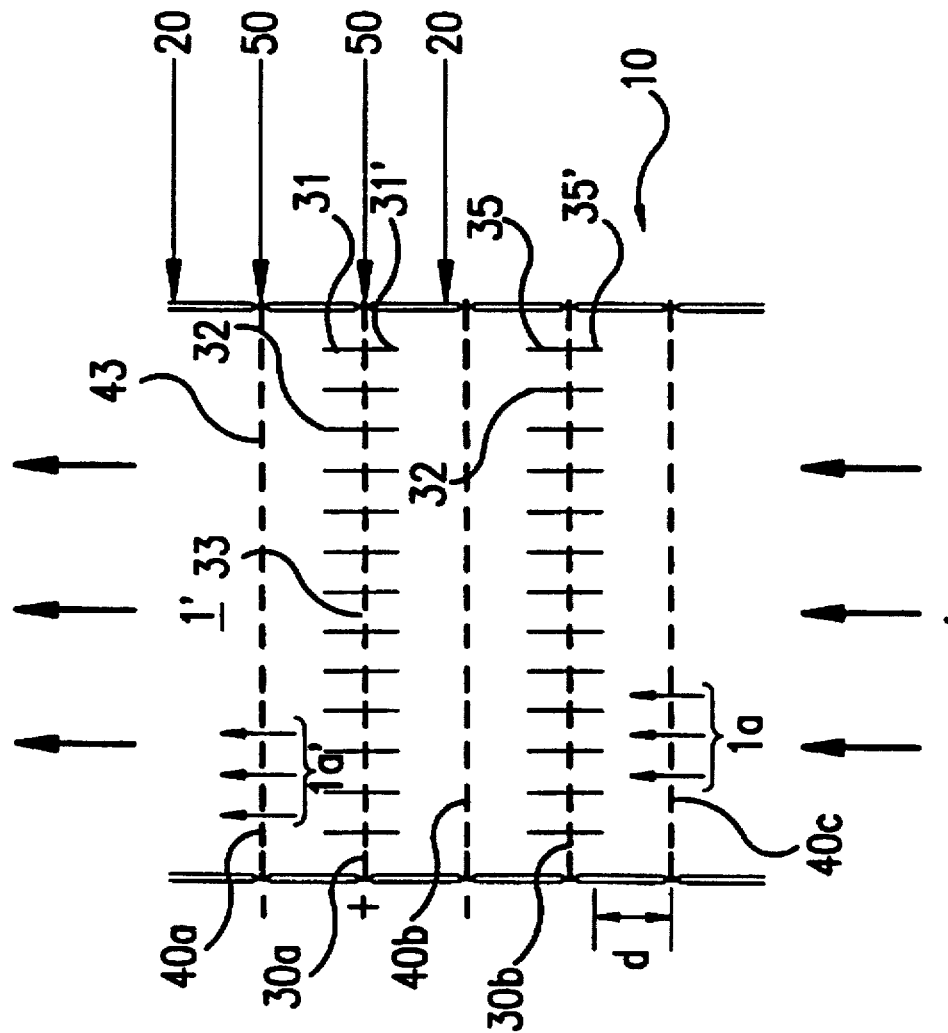
FIG. 1 is a schematic diagram illustrating a cross-sectional view of the preferred embodiment of the subject corona discharge reactor.
Figure 1A:
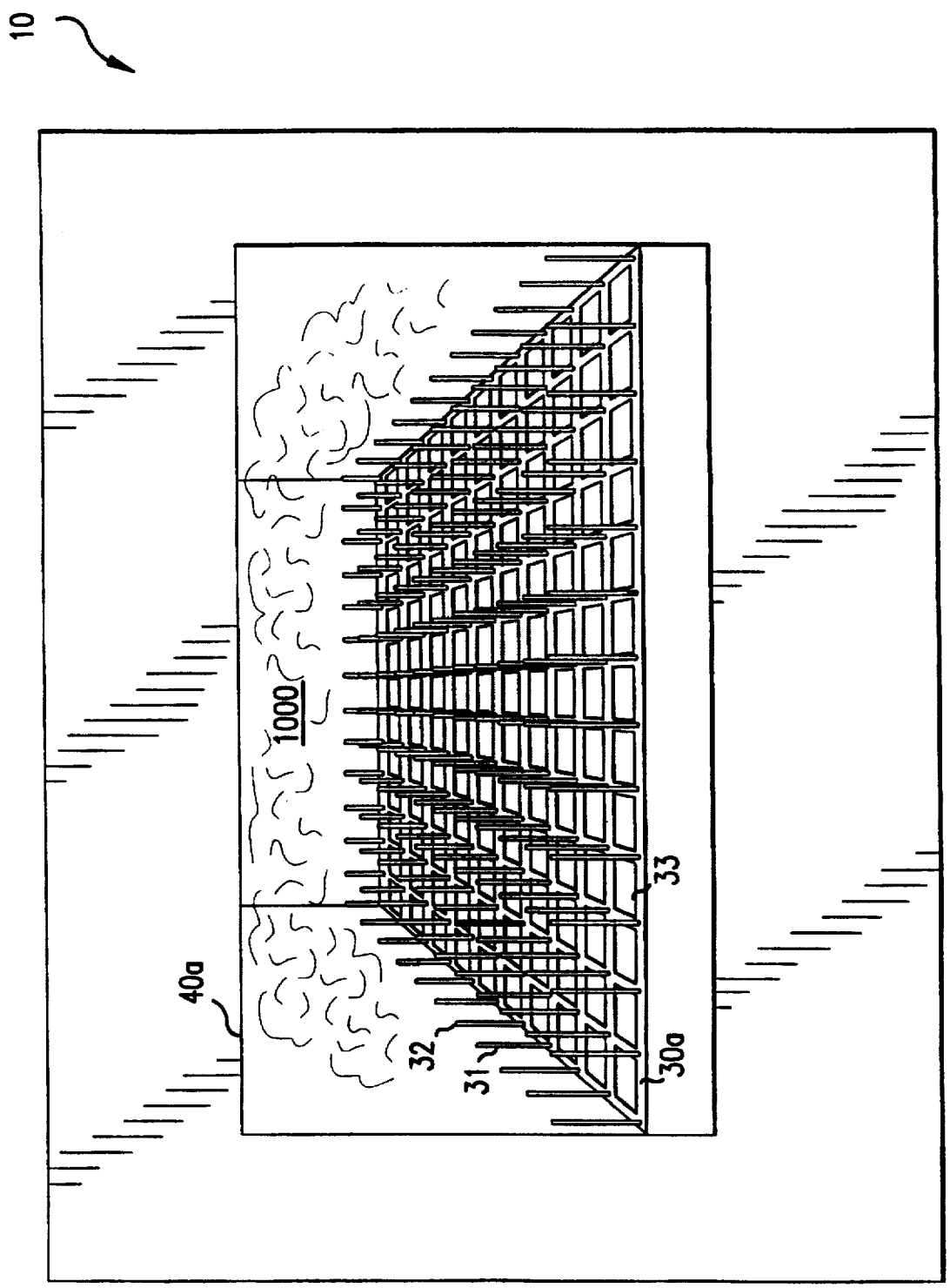
FIG. 1a is a partial perspective view of a portion of the subject corona discharge reactor.

Referring now to FIG. 1 and FIG. 1a, there is shown corona discharge reactor 10 for use in a gas stream reactor system, or more specifically, in a flue gas reactor system. The corona discharge reactor preferably comprises a plurality of coaxially-stacked dielectric sections 20 of common cross-sectional shape and equal cross-sectional dimensions. Dielectric sections 20 may possess another cross-sectional shape, for instance, a rectangle or square, or have another material composition; however, each dielectric section 20 in the preferred embodiment has a circular cross-sectional shape of uniform diameter and is formed of a glass composition. Dielectric sections 20, when stacked together, thus form generally a cylindrical conduit through which a stream of flue gas flows, as indicated by the inlet and outlet arrows 1, 1'.

In accordance with the present invention, a discharge plate 30a is captured and supported between two adjoining dielectric sections 20, 20 to extend transaxially across the flow path of the flue gas. Discharge discharge plate 30a has a plurality of through openings 33 formed therein and a plurality of fine, wire-like corona discharge electrodes 31 extending substantially normally from at least one of its two planar surfaces. Corona discharge electrodes 31 are evenly dispersed about discharge plate 30a between through openings 33 as shown. Each corona discharge electrode 31 has a free end, or tip 32, which forms a corona point. Opposing the tips 32 of corona discharge electrodes 31 of discharge plate 30a is an electrode plate 40a captured and supported between another pair of adjoining dielectric sections 20, 20. Displaced from the tips 32 of corona discharge electrodes 31 preferably by a distance d of approximately 1", electrode plate 40a has a plurality of through openings 43 coaxially aligned with, and having the same cross-sectional width and dimensions as through openings 33 of discharge plate 30a.

A portion of each plate 30a and 40a extends radially beyond the sidewalls of dielectric sections 20 to form power connection tabs 50. Silicon gaskets are fitted at the interface of each plate 30a, 40a and the dielectric sections 20 between which the given plate 30a, 40a is supported so as to prevent the escape of gas therethrough.

One discharge plate 30a, one set of corona discharge electrodes 31 extending from one planar surface of plate 30a, and one electrode plate 40a constitute a singular means for forming a corona discharge cloud. Although in accordance with the present invention, only one such means for forming a corona discharge cloud is necessary, the preferred embodiment incorporates two pairs of such means, each pair being sandwiched between adjacent respective ones of electrode plates 40a,40b, and 40c. Within each such pair, the paired means for forming a corona discharge cloud share a common discharge plate 30a, 30b, each opposing planar face of the plate 30a, 30b having a set of corona discharge electrodes, 31 and 31', 35 and 35' extending therefrom.

Corona discharge electrodes 31, 31', 35, 35' of a given set are each preferably ½ inch in length and are soldered to a discharge plate 30a, 30b in rows, each electrode 31, 31', 35, 35' spaced 7/16 inch apart from immediately neighboring members of the set. Each through opening 33, 43 of plates 30a, 30b, 40a, 40b, 40c preferably has a square cross-sectional shape having sides of ⅜ inch length; and, a corona discharge electrode 31, 31', 35, 35' is positioned adjacent each corner of a given through opening 33, 43. Through openings 33, 43 of 30a–b and 40a–c are arranged to be substantially aligned with one another along the axis of corona discharge reactor 10.

With this configuration, when a high voltage power source is connected across the tabs 50, 50 of discharge plates 30a, 30b and electrode plates 40a–c, a corona discharge is generated between each corona point 32 and its opposing electrode plate 40a–c, and a spatially-distributed corona discharge cloud 1000 results. As a stream of flue gas flows into corona discharge reactor 10 at inlet 1, electrode plate 40c causes the gas stream to be divided into a plurality of parallel gas stream portions, shown flowing into corona discharge reactor 10 by the arrows at 1a and out of corona discharge reactor by the arrows at 1a', which respectively travel through individual flow passages. The flue gas stream portion passing through each flow passage then successively encounters that portion of the corona discharge clouds 1000 formed by the four discharge electrodes immediately surrounding each through opening 33 it travels through. Consequently, constituents of the flue gas stream portion in any given flow passage is as thoroughly exposed to corona discharge as are the constituents of a flue gas stream portion in any other flow passage. Moreover, contact with corona discharge cloud 1000 occurs for the constituents of each parallel flue gas stream portion in very close proximity to the points of corona discharge, where electron energy level are high. Thus, optimum conditions are realized for the occurrence of oxidation, reduction, or other chemical activation of those constituents.

Referring now to the powering scheme for generating the corona discharges of corona discharge reactor 10, various means for generating corona are known. One such means is pulsed corona generation which refers to the application of positive or negative high-voltage pulses having extremely fast transition times (pulse widths typically are in microseconds; pulse transition times are typically in tens of nanoseconds) to corona discharge electrodes having high curvature geometry, such as a thin wire or a sharp point. This approach offers several advantages over other approaches. First, the use of fast, short pulses enable electrode voltages to significantly exceed the DC breakdown voltages of typical DC systems. This results in the emission of higher energy electrons which, in turn, yield more efficient chemical activation of the constituents of a passing gas stream. Second, the use of voltage pulses prevents the waste of energy that would otherwise result from the fueling of unnecessary ion movements and gas stream heating caused by unpulsed application of high voltage.

In the preferred embodiment, the pulsed voltage energization approach is employed. Employing pulsed voltage energization permits higher voltages to be applied to tabs 50—such that higher electric fields may be generated across the gaps between corona points 32 and their corresponding electrode plates 40a–c—as the short durations of voltage application suppress the formation of sparks across the gap. Preferably, voltage pulses on the order of 27 kilovolts (KV) at a frequency of 400 pulses per second are applied to tabs 50. Such pulses are preferably generated by coupling to the output of high voltage power supply, such as a 50 KV, 20 mA Hipotronics DC power supply, a pulse generator, such as an Ion Physics pulse generator to form the circuit illustrated in FIG. 3. As there shown, the pulse generator essentially places in series with high voltage power supply 100, a charging resistor 105 and charging capacitor 110. The circuit generates a series of high voltage pulses which prompt corona discharges across the spark gap 115 formed between each corona discharge point 32 and its opposing electrode plate 40a–40c.

Figure 2:
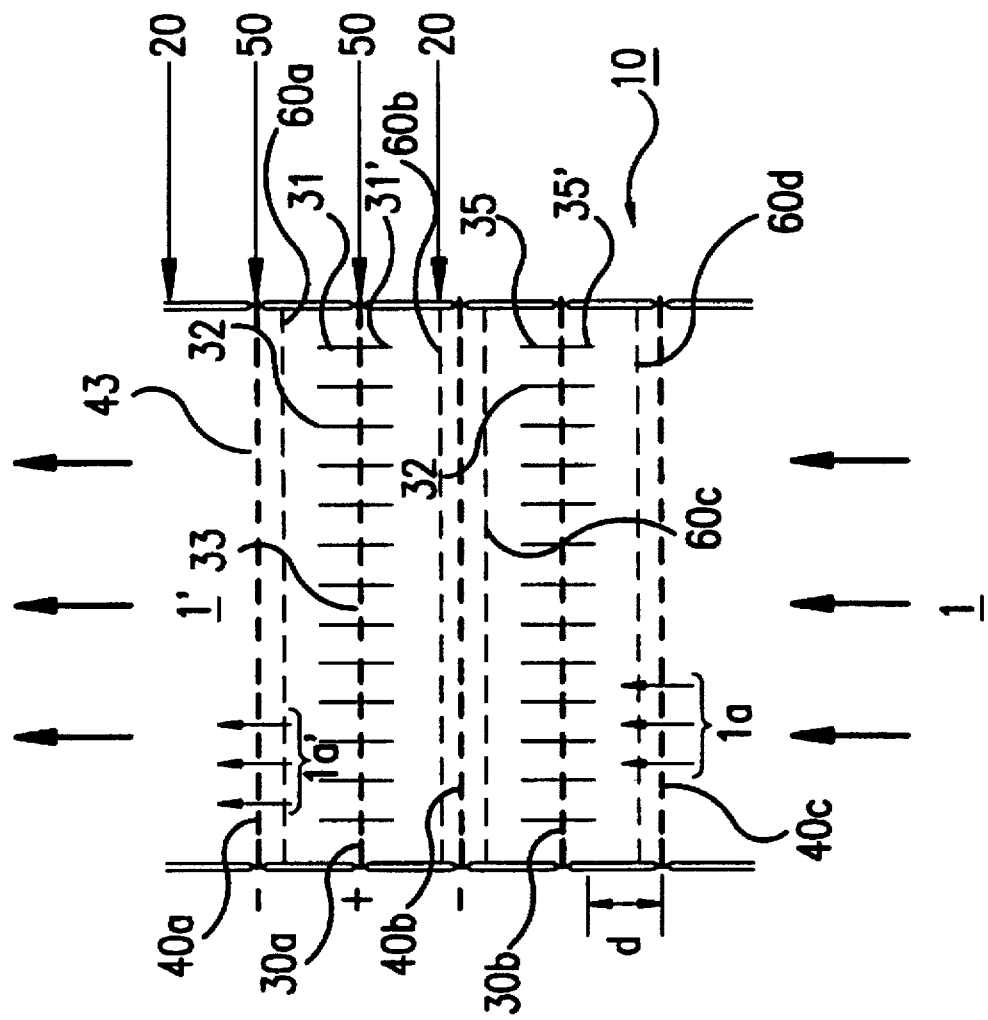
FIG. 2 is a schematic diagram illustrating the cross-sectional view of an alternate embodiment of the subject corona discharge reactor.

Referring now to FIG. 2, there is shown an alternate embodiment of corona discharge reactor 10. The reactor diagram is very similar to that shown in FIG. 1, and the same numerals designate the same elements designated thereby in FIG. 1. What is new in this embodiment is the addition of back corona discharge members 60a–d in the form of a porous high-resistance material respectively overlaying the faces of electrode plates 40a–c opposing a set of corona points 32. The high resistance material is preferably a sheet of square-woven fiberglass cloth having a weave weight of 6 ounces per square yard. As forward corona discharge is generated at each corona discharge point 32, an intense electric field is generated in the high resistance fiberglass material of the opposing back corona discharge member 60a–d sufficient to break down the gas in the interstices thereof. Back corona, visually manifesting itself in a bright, uniform glow of the entire sheet of fiberglass material 60a–d, then results. Consequently, as a gas stream passes through the fiberglass material 60a–d, constituents of the gas stream are exposed to the uniformly distributed active radicals of the generated back corona discharge. Further chemical activation of those constituents thus occurs.

Figure 3:
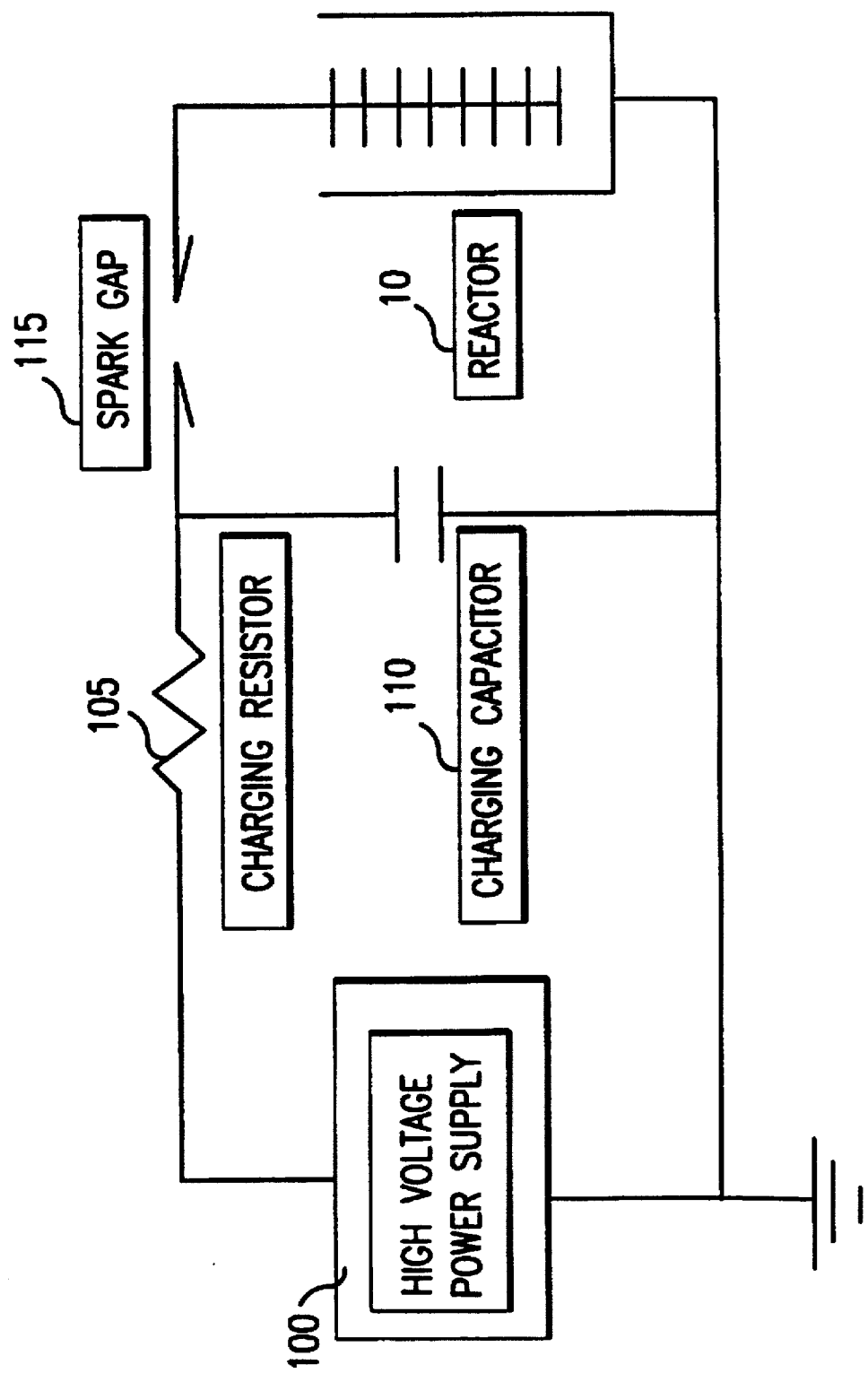
FIG. 3 is a schematic diagram illustrating the powering circuit for the subject corona discharge reactor; and, FIG. 4 is a schematic diagram illustrating the cross-sectional view of another alternate embodiment of the subject corona discharge reactor.

Referring now to FIG. 3, there is shown another alternate embodiment of the subject corona discharge reactor 10. In this alternate embodiment, a uniformly distributed corona discharge cloud 1000 is formed in a manner similar to that described in preceding paragraphs. Corona discharge electrodes 135 extend substantially normally from discharge plate 130, and an electrode plate 140 opposes the tips, or corona points, 132 of corona discharge electrodes 135. Pulsed voltage energization of corona discharge electrodes 135 causes the generation therefrom a plurality of corona discharges which collectively form corona discharge cloud 1000 between corona points 132 and electrode plate 140.

The primary difference in this embodiment from the preferred embodiment is that the flow path of the passing gas stream is substantially parallel to the plane defined by the plurality of corona points 132. The flow path is indicated at the inlet of corona discharge reactor 10 by the arrow marked 200 and, at the outlet, by the arrow marked 200'. While this embodiment fails to espouse all the operationally advantageous features found in the embodiments described in preceding paragraphs, it does offer a simpler structure for exposing the constituents of a gas stream to a uniformly distributed corona discharge cloud 1000. Any loss in chemical activation efficiency in this embodiment compared to the preferred embodiment resulting from the absence of a flow path distribution or division means, or from the separation of distal portions of the gas stream flow path from corona points 132 is sufficiently compensated for by extending the flow path length L.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described; certain features may be used independently of other features; and in certain cases, relative locations of elements may be reversed or interposed, all without departing from the spirit or scope of the invention as defined in the appended claims.

What is claimed is:

1. A reactor for chemically activating constituents of a gas stream by use of corona discharge comprising:

(a) a conduit defining a flow path for passage of said gas stream therethrough;

(b) a plurality of corona discharge electrodes in line with said flow path;

(c) means coupled to said corona discharge electrodes for electrically activating said corona discharge electrodes to respectively generate in substantially simultaneous manner therefrom a plurality of said corona discharges forming a substantially uniformly distributed corona discharge cloud intercepting said flow path; and, (d) means for passing said gas stream through said flow path for reacting constituents of said gas stream selected from the group consisting of sulfur dioxide, nitrogen oxygen compounds and mercury vapor with said corona discharge cloud to chemically activate at least a portion of said constituents to produce compounds that are more easily removed from said gas stream than said constituents.

2. The reactor for chemically activating constituents of a gas stream as recited in claim 1 further comprising means for dividing said gas stream coupled to said conduit, said means for dividing said gas stream substantially traversing said flow path for dividing said gas stream passing therethrough into a plurality of substantially parallel gas stream portions prior to intercepting said corona discharge cloud, said means for dividing said gas stream including a discharge plate extending across said flow path and having a plurality of through openings formed therein, said plurality of corona discharge electrodes being coupled to said discharge plate in spaced relationship, each of said plurality of through openings having a respective four of said plurality of corona discharge electrodes positioned in a surrounding envelope about said through opening for forming said distributed corona discharge cloud uniformly with respect to said plurality of substantially parallel gas stream portions.

3. A reactor for chemically activating constituents of a gas stream by use of corona discharge comprising:

a. an elongate conduit for passage of said gas stream therethrough;

b. electrode means coupled to said conduit for forming therein a corona discharge cloud, said electrode means including at least one substantially planar discharge plate having a plurality of first through openings formed therein and a plurality of corona discharge electrodes electrically connected thereto, said discharge plate having opposing upper and lower surfaces, said corona discharge electrodes projecting from at least one of said upper and lower surfaces of said discharge plate, each of said plurality of first through openings having a respective four of said plurality of corona discharge electrodes positioned in a surrounding envelope about said first through opening for uniformly distributing said corona discharge cloud, each of said corona discharge electrodes defining a corona point for generating a corona discharge therefrom, said electrode means further including a substantially planar electrode plate coupled to said conduit and having a plurality of second through openings formed therein, said electrode plate being disposed in spaced relation to said discharge plate, said electrode plate having a pair of opposing outer surfaces, at least one of said outer surfaces opposing said corona points; and, c. means for generating a predetermined electric potential difference between said discharge plate and said electrode plate, said corona discharge cloud chemically activating constituents of said gas stream selected from the group consisting of sulfur dioxide, nitrogen oxygen compounds and mercury vapor during passage of said gas stream through said conduit to produce compounds that are more easily removed from said gas stream than said constituents.

4. A method for chemically activating constituents of a gas stream by use of corona discharge comprising the steps of:

(a) providing a gas stream having at least one constituent selected from the group consisting of sulfur dioxide, nitrogen oxygen compounds and mercury vapor;

(b) establishing a flow path for passage of said gas stream therethrough;

(c) providing a plurality of corona discharge electrodes coupled to a discharge plate within said flow path for respectively generating a plurality of corona discharges, said discharge plate having a plurality of through openings formed therein;

(d) substantially simultaneously energizing said plurality of corona discharge electrodes to form a distributed corona discharge cloud adjacent said plurality of corona discharge electrodes; and, (e) contacting said corona discharge cloud with said at least one constituent to produce a compound thereof that is more easily removed from said gas stream than said at least one constituent.

5. The method for chemically activating constituents of a gas stream as recited in claim 4 where said step of providing a plurality of corona discharge electrodes includes the step of providing said plurality of corona discharge electrodes in a predetermined pattern to form a surrounding envelope by a respective four of said plurality of corona discharge electrodes about each of said through openings of said discharge plate, said predetermined pattern forming said distributed corona discharge cloud uniformly across said flow path.

* * * * *